United States Patent
Safai et al.

(10) Patent No.: US 9,995,288 B2
(45) Date of Patent: Jun. 12, 2018

(54) SOLID-STATE MOTOR AND ASSOCIATED SYSTEMS AND METHODS

(71) Applicant: The Boeing Company, Chicago, IL (US)

(72) Inventors: Morteza Safai, Newcastle, WA (US); Kimberly D. Meredith, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 15/009,223

(22) Filed: Jan. 28, 2016

(65) Prior Publication Data

US 2017/0218928 A1  Aug. 3, 2017

(51) Int. Cl.
*F03G 7/06* (2006.01)
*B64C 13/30* (2006.01)
*F16G 1/20* (2006.01)
*G05D 23/275* (2006.01)

(52) U.S. Cl.
CPC .............. *F03G 7/065* (2013.01); *B64C 13/30* (2013.01); *F16G 1/20* (2013.01); *G05D 23/27535* (2013.01)

(58) Field of Classification Search
CPC .................................. F03G 7/06; F03G 7/065
See application file for complete search history.

(56) References Cited

U.S. PATENT DOCUMENTS

| 4,117,680 A * | 10/1978 | Smith | ............... F03G 7/065 60/527 |
| 4,150,544 A * | 4/1979 | Pachter | ............... F03G 7/06 60/527 |
| 4,246,754 A | 1/1981 | Wayman | |
| 5,817,188 A | 10/1998 | Yahatz et al. | |
| 6,272,857 B1 | 8/2001 | Varma | |

(Continued)

FOREIGN PATENT DOCUMENTS

| DE | 102012202394 A1 | 8/2012 |
| JP | H07224754 A | 8/1995 |

OTHER PUBLICATIONS

Hartl et al., Characterization and 3-D Modeling of Ni60Ti SMA for Actuation of a Variable Geometry Jet Engine Chevron, Texas A&M University, College Station, TX, U.S.A., Proceedings of SPIE vol. 6529 65293Z-1, 12 pages.

(Continued)

*Primary Examiner* — Jonathan Matthias
(74) *Attorney, Agent, or Firm* — Kunzler, PC

(57) ABSTRACT

Described herein is a motor comprising a first rotatable member and an anchor, spaced apart from the first rotatable member. The motor also comprises a belt, in tension about the first rotatable member and the anchor. The belt is co-rotatably engaged with the first rotatable member. Further, the belt is made from a shape-memory alloy. Additionally, the motor comprises a thermal regulation device, positioned between spaced-apart first and second portions of the belt. The thermal regulation device is also configured to concurrently cool the first portion of the belt to contract the first portion of the belt and heat the second portion of the belt to expand the second portion of the belt. Concurrent contraction and expansion of the first and second portions of the belt cause rotation of the belt.

20 Claims, 8 Drawing Sheets

(56) References Cited

U.S. PATENT DOCUMENTS

| | | |
|---|---|---|
| 6,499,952 B1 | 12/2002 | Jacot et al. |
| 2003/0188540 A1 | 10/2003 | Van Winkle |
| 2005/0039452 A1 | 2/2005 | Howard |
| 2005/0069842 A1 | 3/2005 | Schleppenbach et al. |
| 2009/0000309 A1 | 1/2009 | Hershberger et al. |
| 2011/0120116 A1 | 5/2011 | Alexander et al. |
| 2015/0000264 A1 | 1/2015 | Browne et al. |
| 2015/0240793 A1 | 8/2015 | Safai et al. |

OTHER PUBLICATIONS

Hartl et al., Experimentally Validated Numerical Analysis of Aerostructures Incorporating Shape Memory Alloys, Proceedings of SPIE 6929 692913-1, 11 pages.

Peltier Device Information Directory, http://www.peltier-info.com/photos.html, retrieved Jan. 6, 2014.

Calkins et al., Shape Memory Alloy Based Morphing Aerostructures, Journal of Mechanical Design, Nov. 2010, pp. 111012-1 through 11012-7, vol. 132.

Ruggeri et al., Shape memory actuator systems and the use of thermoelectric modules, Smart Structures and Materials, Proceedings of SPIE vol. 4698 (2002), pp. 386-394.

Selden, et al., "Segmented Binary Control of Shape Memory Alloy Actuator Systems Using the Peltier Effect," Proceedings of the 2004 IEEE International Conference on Robotics and Automation, Apr. 2004, 4931-4936.

European Search Report for EP Patent Application No. 17153410.0 dated Jun. 30, 2017.

\* cited by examiner

SOLID-STATE MOTOR AND ASSOCIATED SYSTEMS AND METHODS

FIELD

This disclosure relates generally to motors, and more particularly to motors made from shape-memory alloys.

BACKGROUND

Some high-tech industries have started incorporating shape-memory alloys into various products. Today, many complex structures, such as aircraft, spacecraft, automobiles, and the like, are made from shape-memory alloys. Shape-memory alloys are special metallic materials that are capable of returning to a previously defined shape (e.g., original shape) after being heated to deformation (e.g., a deformed state).

Generally, a shape-memory alloy is in a martensite low temperature phase with a cubic crystal structure, which begins to transform into an austenite high temperature phase with a monoclinic crystal upon reaching a first austenite threshold temperature. The transformation from the martensite low temperature phase to the austenite high temperature phase is completed upon reaching a second austenite threshold temperature higher than the first austenite threshold temperature. From the austenite high temperature phase, the transformation to the martensite low temperature phase is initiated and completed after the temperature of the shape-memory alloy is cooled below first and second martensite threshold temperatures, respectively. As the shape-memory alloy transforms between the austenite high temperature phase and martensite low temperature phase, the alloy physically deforms between an original shape and a deformed shape.

Motors are used in a variety of applications, particularly those associated with aircraft control and operation. However, many conventional motors are heavy, complex, and unreliable.

The unique characteristics (e.g., pseudoelasticity and shape memory effect) of shape-memory alloys promote their use in different applications. However, the use of shape-memory alloys in motors is limited.

SUMMARY

The subject matter of the present application has been developed in response to the present state of the art, and in particular, in response to the shortcomings of motors for use with various systems, such as aircraft, that have not yet been fully solved by currently available techniques. Accordingly, the subject matter of the present application has been developed to provide a solid-state motor that utilizes shape-memory alloys, and associated systems and methods, that overcome at least some of the above-discussed shortcomings of prior art techniques.

According to one embodiment, a motor comprises a first rotatable member and an anchor, spaced apart from the first rotatable member. The motor also comprises a belt, in tension about the first rotatable member and the anchor. The belt is co-rotatably engaged with the first rotatable member. Further, the belt is made from a shape-memory alloy. Additionally, the motor comprises a thermal regulation device, positioned between spaced-apart first and second portions of the belt. The thermal regulation device is also configured to concurrently cool the first portion of the belt to contract the first portion of the belt and heat the second portion of the belt to expand the second portion of the belt. Concurrent contraction and expansion of the first and second portions of the belt cause rotation of the belt.

In some implementations of the motor, the anchor comprises a second rotatable member. The belt can be co-rotatably engaged with the second rotatable member.

According to certain implementations of the motor, the first rotatable member comprises a drive shaft. The first rotatable member may further comprise a wheel co-rotatably coupled with the drive shaft.

In certain implementations, the motor further comprises spaced-apart first and second guide elements engaged with the belt. The first and second guide elements cooperate with the anchor to position the first portion of the belt a first distance away from the thermal regulation device and position the second portion of the belt a second distance away from the thermal regulation device. The first distance and the second distance are the same. The first distance and the second distance can be constant along an entire length of the thermal regulation device.

According to some implementations of the motor, the thermal regulation device comprises a first surface directly adjacent the first portion of the belt. Also, the thermal regulation device comprises a second surface directly adjacent the second portion of the belt. Furthermore, the thermal regulation device is selectively operable to generate a first temperature of the first surface and a second temperature of the second surface. The first temperature is different than the second temperature. The thermal regulation device can be powered by an electrical power signal. Moreover, the first temperature and the second temperature can be inversely proportionally adjustable by adjusting a current of the electrical power signal. The thermal regulation device can comprise at least one heat transfer element, positioned between and thermally coupled with the first and second surfaces of the thermal regulation device. The at least one heat transfer element may comprise a P-element made from a P-type semiconductor material and an N-element made from an N-type semiconductor material. The thermal regulation device may comprise an array of heat transfer elements. In a first operational mode, the first temperature can be higher than the second temperature to cause rotation of the belt in a first rotational direction. In a second operational mode, the first temperature can be lower than the second temperature to cause rotation of the belt in a second rotational direction, opposite the first rotational direction.

In certain implementations, the motor further comprises a control module operably coupled with the thermal regulation device. The control module is configured to activate the thermal regulation device, to cause the first rotatable member to rotate, modulate the thermal regulation device, to adjust a rotational speed of the first rotational member, and deactivate the thermal regulation device, to cause the first rotatable member to stop rotating. The motor can further comprise at least one temperature sensor, configured to sense a temperature of the thermal regulation device. The control module modulates the thermal regulation device, to adjust a rotational speed of the first rotational member, based, at least in part, on the temperature of the thermal regulation device sensed by the at least one temperature sensor.

According to another embodiment, an aircraft comprises an actuatable element and a motor, coupled with the actuatable element and operable to actuate the actuatable element. The motor comprises a first rotatable member, an anchor, spaced apart from the first rotatable member, and a belt, in tension about the first rotatable member and the anchor. The belt is co-rotatably engaged with the first rotatable member and the belt is made from a shape-memory alloy. The motor further includes a thermal regulation device, positioned between spaced-apart first and second portions of the belt and configured to concurrently cool the first portion of the belt to contract the first portion of the belt and heat the second portion of the belt to expand the second portion of the belt. Concurrent contraction and expansion of the first and second portions of the belt causes rotation of the belt.

In yet another embodiment, a method of rotating a first rotatable member comprises co-rotatably coupling a belt, made from a shape-memory alloy, with the first rotatable member. Additionally, the method includes cooling a first portion of the belt to contract the first portion of the belt. The method also includes, while cooling the first portion of the belt, heating a second portion of the belt to expand the second portion of the belt.

According to some implementations of the method, cooling the first portion of the belt and heating the second portion of the belt comprises transmitting an electrical current through a P-N element. The P-N element comprises a P-element made from a P-type semiconductor material and an N-element made from an N-type semiconductor material.

In certain implementations of the method, the first portion of the belt is cooled and the second portion of the belt is heated by a thermal regulation device positioned between the first portion of the belt and the second portion of the belt. The method further comprises determining a temperature of the thermal regulation device and adjusting the temperature of the thermal regulation device if the temperature of the thermal regulation device is not within a predetermined temperature threshold. Also, the method can comprise determining a rotational speed of the belt and adjusting the temperature of the thermal regulation device if the rotational speed of the belt is not within a predetermined speed threshold. The method may additionally comprise transmitting an electrical power signal to the thermal regulation device. Adjusting the temperature of the thermal regulation device comprises modulating a current of the electrical power signal.

According to some implementations of the method, cooling the first portion of the belt and heating the second portion of the belt rotates the belt in a first rotational direction. The method further comprises heating the first portion of the belt and cooling the second portion of the belt to rotate the belt in a second rotational direction, opposite the first rotational direction.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figures 1, 2:
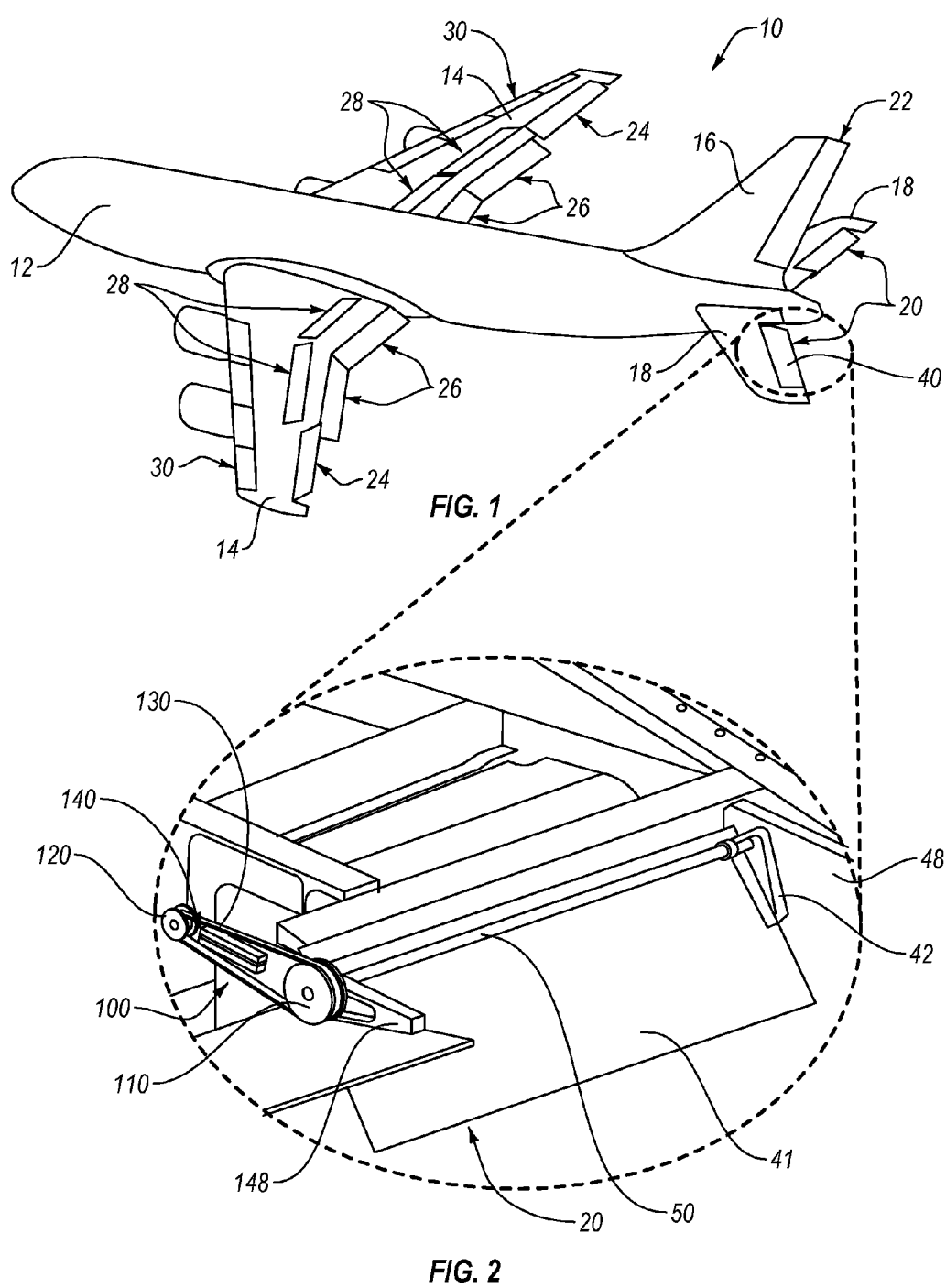
FIG. 1 is a perspective view of an aircraft, according to one or more embodiments of the present disclosure.
FIG. 2 is a magnified perspective view of a horizontal stabilizer portion of the aircraft of FIG. 1, with an upper surface of a stabilizer and an upper panel removed for convenience in showing a motor, according to one or more embodiments of the present disclosure.

Referring to FIG. 1, one embodiment of an aircraft 10 is shown. The aircraft 10 can be any of various types of aircraft, such as commercial aircraft used for the transportation of passengers, military aircraft for military operations, personal aircraft, and the like. Moreover, although an aircraft is depicted in the illustrated embodiments, in other embodiments, another structure, such as a vehicle (e.g., helicopter, boat, spacecraft, automobile, etc.) or non-mobile complex structure (e.g., building, bridge, machinery, etc.), with any of various adjustable elements, can be used.

The depicted aircraft 10 includes a body 12 (e.g., fuselage), a pair of wings 14 coupled to and extending from the body 12, a vertical stabilizer 16 coupled to the body, and a pair of horizontal stabilizers 18 coupled to the body and/or the vertical stabilizer. The aircraft 10 can be any of various types of aircraft, such as a passenger airplane, a fighter jet, a helicopter, spacecraft, and the like. As depicted in FIG. 1, the aircraft 10 represents a passenger airplane.

The aircraft 10 further includes a plurality of actuator systems that actuate any of various adjustable elements. The actuator systems may include, for example, flight control systems, landing systems, fuel systems, engine systems, passenger and cargo entry/exit systems, and the like. In some implementations, the flight control systems actuate aerodynamic surfaces that are adjustable to change the characteristics of air flow over, around, and trailing the surfaces. For example, each wing 14 includes an aileron 24, flaps 26, spoilers 28, and slats 30. Additionally, the vertical stabilizer 16 includes a rudder 22, and each horizontal stabilizer 18 includes an elevator 20. For responsive control of the flight of the aircraft 10, the relative position of the adjustable aerodynamic surfaces of the aircraft, such as those shown in FIG. 1, should be capable of rapid and precise adjustment. Accordingly, the actuator systems (e.g., flight control systems) for adjusting the position of adjustable aerodynamic surfaces are designed to promote rapid and precise adjustment of the surfaces. Additionally, the actuator systems for adjusting the position of adjustable aerodynamic surfaces are desirably lightweight, reliable, and efficient. Although some current mechanical, hydraulic, and pneumatic controlled actuator systems may provide rapid and precise adjustment of the surfaces, such systems are generally heavy and inefficient. In contrast, although some conventional actuator systems that use shape-memory alloy actuators may be lightweight and efficient, such conventional systems would provide only slow, inefficient, or imprecise control of adjustable aerodynamic surfaces if implemented in an aircraft, or other vehicle or structure.

According to certain embodiments, the actuator system of the present disclosure includes a motor that uses a belt made from a shape-memory alloy and a thermal regulation device for regulating temperatures of the belt. Moreover, in some embodiments, the motor is lightweight, reliable, and efficient, and further provides rapid and precise adjustment of an adjustable component, such as an aerodynamic surface of an aircraft. Referring to FIG. 2, the elevator 20 of the horizontal stabilizer 18 of the aircraft 10 is actuated via a motor 100. The elevator 20 includes an upper panel 40 and a lower panel 41 that are joined together at a trailing edge. The upper panel 40 and lower panel 41 define upper and lower surfaces, respectively, of the elevator 20. As mentioned in the above section, for convenience in showing the motor 100, which is positioned proximate a leading edge of the elevator 20, an upper surface of the stabilizer 18 and the upper panel 40 are removed in FIG. 2. The upper and lower panels 40, 41 are supported in proper orientation relative to each other by a pair of brackets 42. The brackets 42 are hingedly coupled to structural components 48 of the horizontal stabilizer 18 such that the brackets and elevator 20 are pivotable relative to the fixed surfaces of the horizontal stabilizer. The horizontal stabilizer 18 includes a drive shaft 50 that spans from the structural component 48 to the opposing structural component 48 of the horizontal stabilizer to rotatably support the elevator 20 relative to the structural components and fixed surfaces of the horizontal stabilizer. In one implementation, the drive shaft 50 includes one or more gears that engage one or more other gears driven by the motor 100. For example, the motor 100 may include a first drive shaft that indirectly drives the drive shaft 50 via one or more gears, gear boxes, and the like.

Generally, the motor 100 is configured to rotate the drive shaft 50, directly or indirectly, which in turn actuates (e.g., rotates) the brackets 42 and the elevator 20. Accordingly, the motor 100 is actuated or controlled to maintain the elevator 20 in, or move the elevator into, a desired position or orientation relative to the horizontal stabilizer 18. The motor 100 includes a first rotatable member 110, an anchor 120, a belt 130, a thermal regulation device 140, and a drive shaft 50. The belt 130, which forms a continuous loop, is in tension about the first rotatable member 110 and the anchor 120. Accordingly, the belt 130 is effectively suspended or supported on the first rotatable member 110 and the anchor 120. Rotation of the belt 130 causes rotation of the first rotatable member 110, which in turn rotates the drive shaft 50 to actuate an adjustable element, such as the elevator 20.

Figure 3:
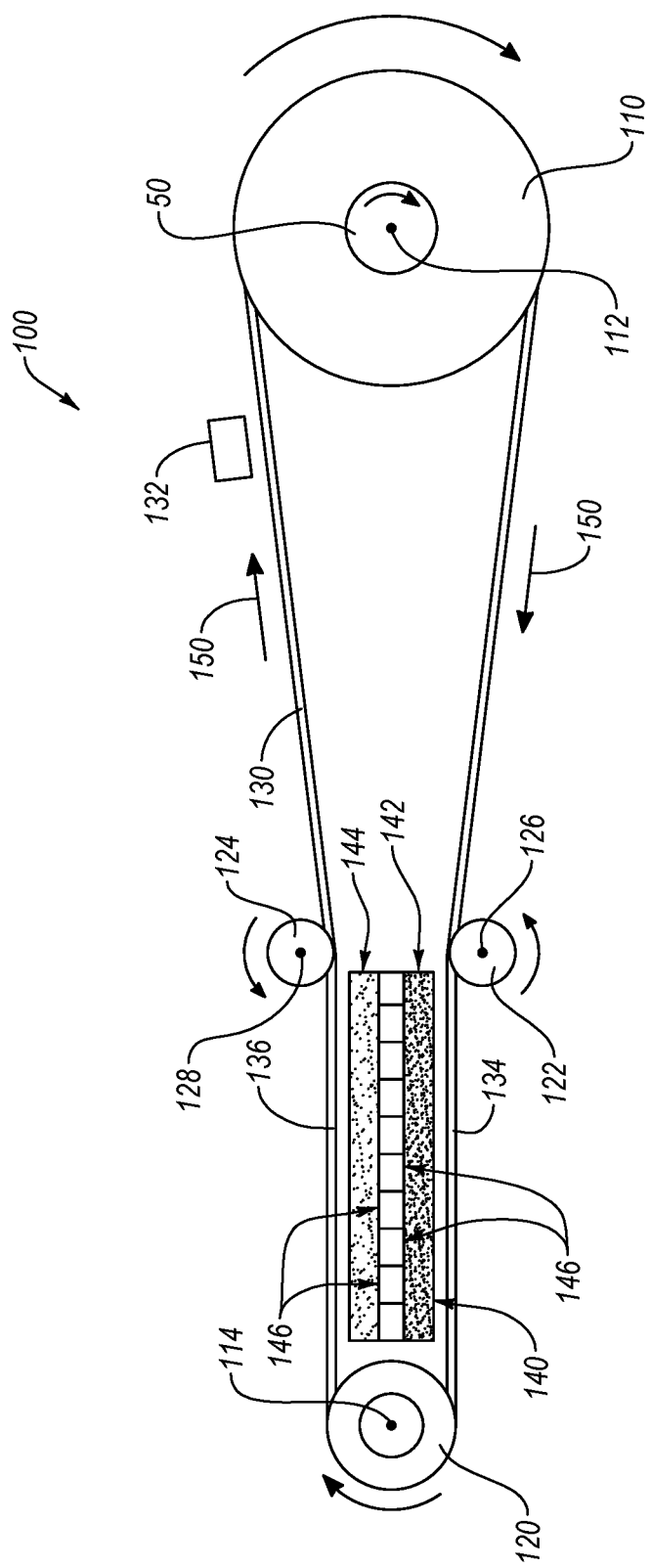
FIG. 3 is schematic, side view of a motor, according to one or more embodiments of the present disclosure.

With reference to FIG. 3, the first rotatable member 110 rotates about a first rotational axis 112 that is fixed relative to the anchor 120 and the thermal regulation device 140. Moreover, the drive shaft 50 is co-rotatably coupled to the first rotatable member 110, such that the drive shaft 50 also rotates about the first rotational axis 112. The first rotatable member 110 can be a disk-like element, such as a wheel or gear. In some implementations, the first rotatable member 110 is circular and defines a circular-shaped outer periphery. Although not shown, the outer periphery of the first rotatable member 110 may include engagement features configured to releasably engage corresponding engagement features of the belt 130 and to facilitate co-rotation of the first rotatable member 110 and the belt 130. For example, the engagement features of the first rotatable member 110 can be teeth or cogs that mesh with corresponding teeth or cogs of the belt. In this manner, the first rotatable member 110 can be in gear-meshing engagement with the belt 130. According to other examples, the corresponding engagement features of the first rotatable member 110 and the belt 130 can include opposing friction-inducing surfaces that, when mated, promote enough friction to maintain co-rotatability between the first rotatable member 110 and the belt 130, but also allow the belt 130 to release from the first rotatable member 110. The engagement features of the first rotatable member 110 may be positioned within a groove, formed in the outer periphery of the first rotatable member 110, which receives the belt 130 and helps to retain engagement of the belt 130 with the first rotatable member 110.

The drive shaft 50 is defined as any component or components capable of transmitting rotational energy from the first rotatable member 110 to an actuatable element. Accordingly, the drive shaft 50 can be any of various power transmission systems known in the art. For example, in one implementation, the drive shaft 50 can include a single solid, non-hollow, shaft. In another implementation, the drive shaft 50 may include a single hollow shaft. In yet certain implementations, although depicted as a single shaft in the illustrated implementations, the drive shaft 50 includes multiple intercoupled components, such as a hollow or non-hollow shaft rotatably coupled to another shaft via one or more gears. The drive shaft 50 can be configured to transmit the rotational energy received from the first rotatable member 110 into any of various type of motion of the actuatable element. For example, the drive shaft 50 may transmit the rotational energy received from the first rotatable member 110 into rotary motion of the actuatable element. In contrast, the drive shaft 50 may convert the rotational energy received from the first rotatable member 110 into linear motion of the actuatable element. Although the actuatable element depicted is an elevator 20 of an aircraft, the motor 100 can be used to actuate any of various adjustable elements of various actuation systems of the aircraft 10 or other vehicles or structures.

The anchor 120 is configured to support the belt 130 in tension about the first rotatable member 110. Additionally, the anchor 120 is configured to allow for rotation of the belt 130, while in tension about the first rotatable member 110.

In one implementation, as depicted, the anchor 120 is a rotatable member, similar to the first rotatable member 110, that rotates about a second rotational axis 114. The second rotational axis 114 is fixed and parallel relative to the first rotational axis 112. Like some implementations of the first rotatable member 110, the anchor 120 may include engagement features configured to releasably engage corresponding engagement features of the belt 130 and to facilitate co-rotation of the anchor 120 and the belt 130.

According to another implementation, the anchor 120 is non-rotatable such that the belt 130 rotates relative to the anchor 120. In such implementations, the anchor 120 may include a low-friction surface that facilitates movement (e.g., sliding) of the belt 130 along the anchor 120.

The belt 130 includes a strip of material that forms a continuous loop. In some implementations, the belt 130 is a thin, elongate strip of material with a thickness less than a width, and a length more than the width. Generally, the belt 130 is at least partially flexible to facilitate redirection of the belt about at least the first rotatable member 110 and the anchor 120. The belt 130 includes an engagement side configured to engage the at least the first rotatable member 110 and the anchor 120. As mentioned above, the engagement side may include engagement features for engaging corresponding engagement features of the first rotatable member 110 and the anchor 120. The belt 130 may be a solid, homogenous, strip of material in some implementations. In other implementations, the belt 130 may be a series of interweaved strips, may have multiple joined layers of the same or different materials, may include intercoupled links, or the like.

Regardless of the construction of the belt 130, the belt 130 is made from, at least partially, a shape-memory alloy capable of exhibiting a two-way shape-memory effect. As defined previously, shape-memory alloys are special metallic materials that are capable of returning to a previously defined shape (e.g., original shape) after being heated or cooled to deformation (e.g., a deformed state). In some embodiments, the shape-memory alloy of the belt 130 is at least one of nickel-titanium alloys and copper-base alloys, among others. The composition of the shape-memory alloy can be selected to provide a desired range of deformation as well as desired upper and lower temperature thresholds associated with respective phase changes of the alloy.

The thermal regulation device 140 is configured to concurrently cool a first portion 134 of the belt 130 to contract the first portion 134 of the belt 130 and heat a second portion 136 of the belt 130 to expand the second portion 136 of the belt 130. Generally, the thermal regulation device 140 includes a first side 142 (e.g., cool side) that cools the first portion 134 of the belt 130 and a second side 144 (e.g., hot side) that heats the second portion 136 of the belt 130. The first side 142 is on an opposite side of the thermal regulation device 140 as the second side 144. In this manner, at a given point in time during operation, the thermal regulation device 140 has a cool side and a hot side, directly opposing each other. Because the belt 130 is made from a shape-memory alloy, cooling the belt 130 results in a contraction (e.g., shortening) of the shape-memory alloy and thus a contraction of the belt 130, as indicated by directional arrows 154 in FIG. 4. In contrast, heating the belt 130 results in an expansion (e.g., lengthening) of the shape-memory alloy and thus an expansion of the belt 130, as indicated by directional arrows 152 in FIG. 4. The concurrent contraction and expansion of the first and second portions 134, 136 of the belt 130 cause rotation of the belt 130 in a first rotational direction 150. The first rotational direction 150 is a rotational direction extending from the first portion 134 of the belt 130 to the second portion 136 of the belt 130.

The first portion 134 of the belt 130 is the portion of the belt directly adjacent a first side 142 of the thermal regulation device 140, at a given point in time, and the second portion 136 of the belt 130 is the portion of the belt directly adjacent a second side 144 of the thermal regulation device 140, at the given point in time. Accordingly, the first portion 134 and second portion 136 of the belt 130 are not fixed portions of the belt. Rather, the first portion 134 and second portion 136 of the belt 130 change as the belt 130 rotates relative to the thermal regulation device 140. More specifically, as the first portion 134 of the belt 130 is cooled and contracted, and the second portion 136 of the belt 130 is heated and expanded, the induced rotation of the belt 130 moves a cooled part of the belt 130 away from cooling effects of the first side 142 of the thermal regulation device 140 in the first rotational direction 150 and moves a heated part of the belt 130 away from the heating effects of second side 144 of the thermal regulation device 140. However, the induced rotation of the belt 130 also moves a corresponding uncooled part of the belt 130 into the cooling effects of the first side 142, and moves a corresponding unheated part of the belt 130 into the heating effects of the second side 144. In this manner, while the thermal regulation device 140 is activated to cool the belt 130 from the first side 142 and heat the belt 130 from the second side 144, the belt 130 is continuously reciprocally cooled and heated to induce a continuous rotation of the belt 130.

The rotational speed of the belt 130, and thus the rotational speed of the first rotatable member 110 is, at least partially, dependent on a temperature differential between the first and second sides 142, 144 of the thermal regulation device 140. More specifically, the higher the temperature differential between the first and second sides 142, 144, the greater the contraction and expansion of the respective first and second portions 134, 136 of the belt 130, and thus the higher the rotational speed of the belt 130. In contrast, the lower the temperature differential between the first and second sides 142, 144, the lesser the contraction and expansion of the respective first and second portions 134, 136 of the belt 130, and thus the lower the rotational speed of the belt 130. Accordingly, the rotational speed of the belt 130 and the first rotatable member 110 controlled by adjusting the temperature differential between the first and second sides 142, 144 of the thermal regulation device 140.

Referring to FIG. 3, the motor 100 includes first and second guide elements 122, 124, respectively, in some embodiments. Generally, the first and second guide elements 122, 124 are configured to cooperate with the anchor 120 to define a gap between the thermal regulation device 140 and the belt 130 by positioning the first portion 134 of the belt 130 a first distance D1 (see, e.g., FIG. 4) away from the first side 142 of the thermal regulation device 140 and position the second portion 136 of the belt 130 a second distance D2 away from the second side 144 of the thermal regulation device 140. Like the anchor 120, the first and second guide elements 122, 124 support the belt 130 in tension about the first rotatable member 110. The first and second guide elements 122, 124 are positioned between the first rotatable member 110 and the anchor 120. Furthermore, the first and second guide elements 122, 124 are sized and spaced apart from each other a specific distance, based on the size of the anchor 120, to achieve predetermined distances D1, D2 between the first and second portions 134, 136 of the belt 130 and the respective first and second sides 142, 144 of the thermal regulation device 140. Moreover, in some implementations, the configuration of the first and second guide elements 122, 124, as well as the anchor 120, support the belt 130 relative to the thermal regulation device 140 such that the first and second distances D1, D2 are the same and/or remain constant along an entire length of the thermal regulation device 140. However, in certain other implementations, the first and second distances D1, D2 can be different or can vary along the length of the thermal regulation device 140. The length of the thermal regulation device 140 extends parallel to the first and second portions 134, 136 of the belt 130. Although in the illustrated embodiment, a gap exists between the first and second portions 134, 136 of the belt 130 and the thermal regulation device 140, in other embodiments, no gap exists between the first and second portions 134, 136 of the belt 130 the first and second portions 134, 136 and the thermal regulation device 140 such that the first and second portions 134, 136 contact the thermal regulation device 140 as the belt moves along the thermal regulation device 140.

The first and second guide elements 122, 124 are configured to support the belt 130 in tension about the first rotatable member 110 and the anchor 120. In some implementations, such as shown, the first rotatable member 110 has a larger diameter than the anchor 120, which causes the belt 130 to converge from the first rotatable member 110 to the anchor 120. Accordingly, the first and second guide elements 122, 124 redirect the belt 130 to ensure the first and second portions 134, 136 of the belt 130 extend parallel to each other before and after engaging the anchor 120. Although not shown, in some embodiments, the first rotatable member 110 has a diameter equal to the anchor 120 such that the belt 130 remains parallel to each other between the first rotatable member 110 and the anchor 120. Additionally, the anchor 120 is configured to allow for rotation of the belt 130, while in tension about the first rotatable member 110.

In one implementation, as depicted, the first and second guide elements 122, 124 are rotatable members, similar to the first rotatable member 110, that rotate about respective third and fourth rotational axes 126, 128. The third and fourth rotational axes 126, 128 are fixed and parallel relative to the first rotational axis 112. Like some implementations of the first rotatable member 110, the first and second guide elements 122, 124 may include engagement features configured to releasably engage corresponding engagement features of the belt 130 and to facilitate co-rotation of the first and second guide elements 122, 124 and the belt 130.

According to another implementation, the first and second guide elements 122, 124 are non-rotatable such that the belt 130 rotates relative to the first and second guide elements 122, 124. In such implementations, the first and second guide elements 122, 124 may include a low-friction surface that facilitates movement (e.g., sliding) of the belt 130 along the first and second guide elements 122, 124.

Referring still to FIG. 3, in one embodiment, the thermal regulation device 140 includes at least one heat transfer element 146 between the first side 142 and the second side 144. The heat transfer element 146 is configured to transfer heat from the first side 142 to the second side 144 to render the first side 142 cool and the second side 144 hot, as depicted schematically, thereby rotating the belt 130 in the first rotational direction 150. Alternatively, the heat transfer element 146 can be configured or oriented to transfer heat from the second side 144 to the first side 142 to render the first side 142 hot and the second side 144 cool, thereby rotating the belt 130 in a rotational direction opposite the first rotational direction 150. In some implementations, as shown, the thermal regulation device 140 includes a plurality of heat transfer elements 146 that define an array of heat transfer elements 146. As will be described in more detail below, with regards to FIGS. 6-8, the thermal regulation device 140 may include some heat transfer elements 146 that transfer heat from the first side 142 to the second side 144, in a first operational mode, and some heat transfer elements 146 that transfer heat from the second side 144 to the first side 142, in a second operational mode. The first side 142 and the second side 144 may include a thermally conductive element, such as a plate made from a thermally-conductive material, as will be described in more detail below.

Figure 4:
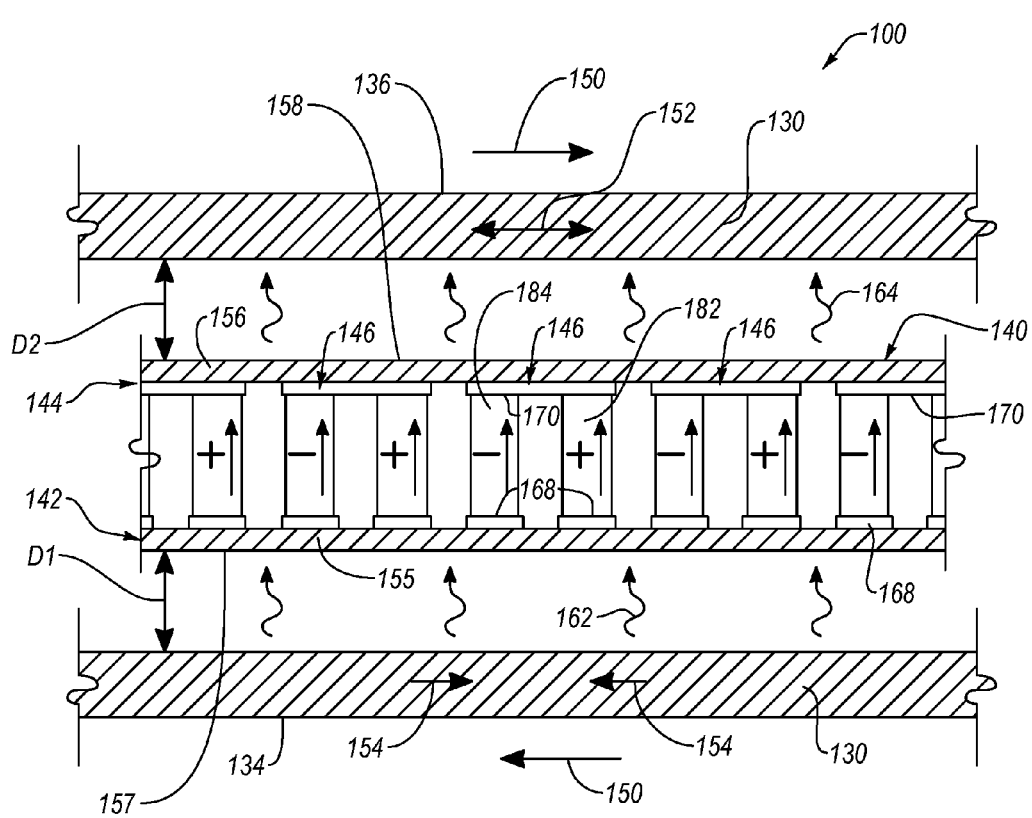
FIG. 4 is a schematic, partial cross-sectional side view of a detail of the motor of FIG. 3, according to one or more embodiments of the present disclosure.

According to one embodiment, shown in FIG. 4, each of the heat transfer elements 146 of the thermal regulation device 140 is a P-N element. The heat transfer elements 146, or P-N elements, are positioned between first and second thermally conductive elements 155, 156. The first and second thermally conductive elements 155, 156 can be plates or layers made from a thermally-conductive material. Moreover, the first and second thermally conductive elements 155, 156 define first and second surfaces 157, 158 directly adjacent or outwardly facing the first and second portions 134, 136, respectively, of the belt 130. In one implementation, the first and second thermally conductive elements 155, 156 are made from thermally conductive and electrically nonconductive (e.g., electrically insulating) materials, such as ceramic, epoxies, and the like. The first and second thermally conductive elements 155, 156 can be made from the same or different materials. Additionally, the first and second thermally conductive elements 155, 156 can be made from a flexible or rigid material. Further, the first and second thermally conductive elements 155, 156 can have any of various shapes and sizes. For example, the first and second thermally conductive elements 155, 156 may have any of various geometries or number of contact points with the belt 130 to facilitate thermal transfer into or out of the belt 130. In one implementation, one or both of first and second thermally conductive elements 155, 156 may have known thermal management geometries or features, such as fins, to facilitate heat transfer.

Each heat transfer element 146 includes a P-element 182 and an N-element 184. The P-element 182 and N-element 184 form a P-N pair. In some implementations, each heat transfer element can include more than one P-element 182 and/or more than one N-element 184. Each P-element 182 and N-element 184 of a given heat transfer element can have any of various shapes. In the illustrated embodiment, the P-element 182 and N-element 184 of each heat transfer element 146 are generally box-shaped with rectangular-shaped cross-sections. The P-elements 182 are made from a P-type semiconductor material (e.g., a semiconductor material, such as silicon, doped with a P-type material, such as boron). Similarly, the N-elements 184 are made from an N-type semiconductor material (e.g., a semiconductor material, such as silicon, doped with an N-type material, such as phosphorus). It is recognized that any of various semiconductor materials doped with any of various P-type and N-type materials can be used to make the P-elements 182 and N-elements 184, respectively, such as bismuth telluride, lead telluride, silicon germanium, and the like.

The P-element 182 and N-element 184 of each heat transfer element 146 are electrically coupled to electrical connections or terminals 168, 170, and an electrical power source (not shown in FIG. 4), to form an electrical circuit. For example, as shown, the P-element 182 and N-element 184 of each heat transfer element 146 is separately electrically coupled to a respective bridge electrical terminal 170 at first ends. One of the electrical terminals 168 for each heat transfer element is electrically coupled to a positive line of an electrical power source, and the other of the electrical terminals 168 is coupled to the negative power line of the electrical power source. Accordingly, the positive and negative power lines of the electrical power source are respectively coupled to the P-element 182 and N-element 184 of each heat transfer element 146. The second ends of the P-element 182 and N-element 184 of each heat transfer element 146 are electrically coupled together by a bridge electrical terminal 170 that extends between the second ends. In this manner, the P-element 182 and N-element 184 of each heat transfer element 146 form a closed electrical circuit with an electrical power source.

Figure 5:
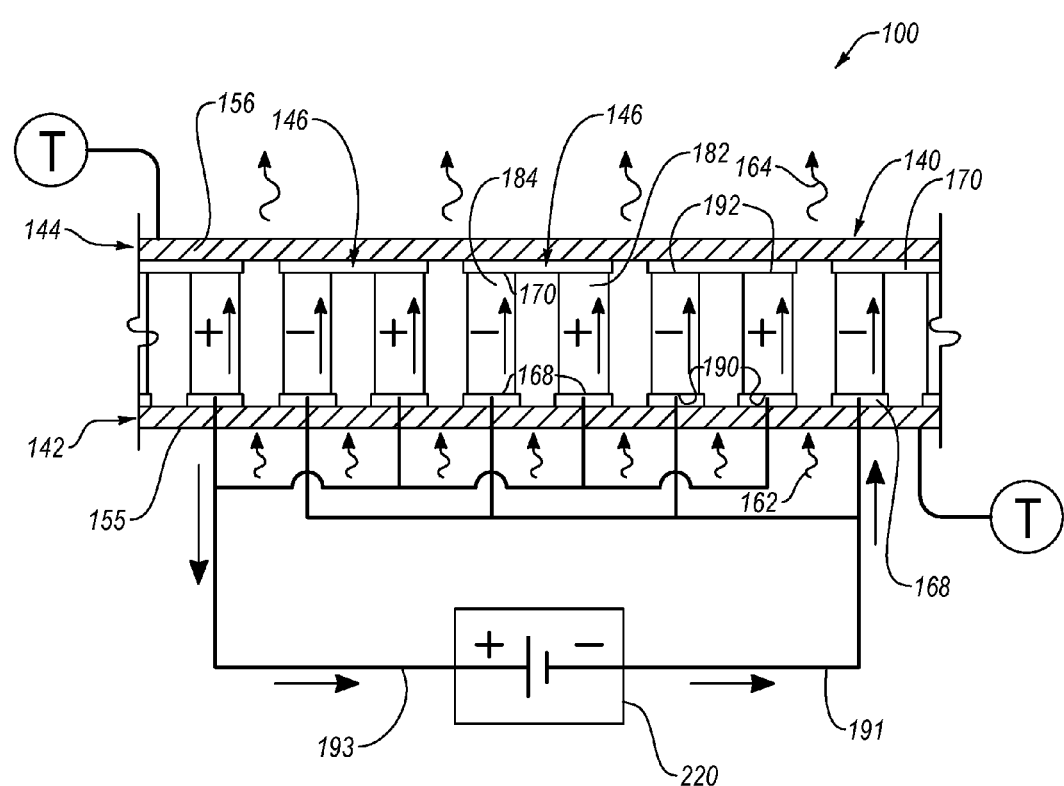
FIG. 5 is a schematic, partial cross-sectional side view of a thermal regulation device of the motor of FIG. 3, according to one or more embodiments of the present disclosure.

As shown in more detail in FIG. 5, in the closed circuit of each heat transfer element 146, electrical current of an electrical power signal passes from a negative power line 191 of the power source 220 into the first electrical terminal 168, coupled to a first end 190 of the N-element 184. From the N-element 184, electrical current passes into and through the bridge electrical terminal 170 electrically coupling second ends 192 of the N-element 184 and P-element 182. From the bridge electrical terminal 170, electrical current passes into and through the P-element 182 and into the second electrical terminal 168 coupled to a first end 190 of the P-element 182. From the second electrical terminal 168 of the P-element 182, the electrical current passes into and through a positive line 193 of the power source 220 to complete the circuit. In some implementations, the electrical power source 220 can be controllable to open and close the circuit as desired.

When the electrical circuit of each is closed, the electrical current passing through the N-element 184 and P-element 182 of each heat transfer element 146 causes electrons in the N-element 184 to flow from the first end 190 to the second end 192 (e.g., from the terminal 168 to the bridge electrical terminal 170, as indicated by directional arrows in FIG. 5). The electrical current passing through the P-element 182 causes positive elements or holes also too flow from the first end 190 to the second end 192 of the P-element 182. The unidirectional flow of electrons (e.g., negative elements) and positive elements through the N-element 184 and P-element 182, respectively, induces a flow of thermal energy in the same direction. Accordingly, the first thermally conductive element 155 has a colder temperature and thus acts as a cold layer or cold plate and the second thermally conductive element 156 has a hotter temperature and thus acts as a hot layer or hot plate. In other words, the flow of thermal energy creates a temperature gradient between the electrical terminals 168, 170, with the electrical terminals 168 being thermally coupled to the first thermally conductive element 155 to create a cold side, and the bridge electrical terminal 170 being thermally coupled to the second thermally conductive element 156 to create a hot side. Therefore, each heat transfer element 146 transfers heat from the first thermally conductive element 155 to cool the first side 142 of the thermal regulation device 140 and transfers heat to the second thermally conductive element 156 to heat the second side 144 of the thermal regulation device 140 via heat transfer induced by the flow of electricity through the N-element 184 and P-element 182.

Based on the foregoing, the thermal regulation device 140 is selectively operable to apply heat or thermal energy to the second portion 136 of the belt 130, as indicated by arrows 164, and to remove heat from the first portion 134 of the belt 130 actuator in a cool mode, as indicated by arrows 162. Generally, the transmission of energy to the second portion 136 of the belt 130 is facilitated by the electrically-induced transfer of subatomic particles or charge carriers in a first direction between the first and second thermally conductive elements 155, 156.

Figure 6:
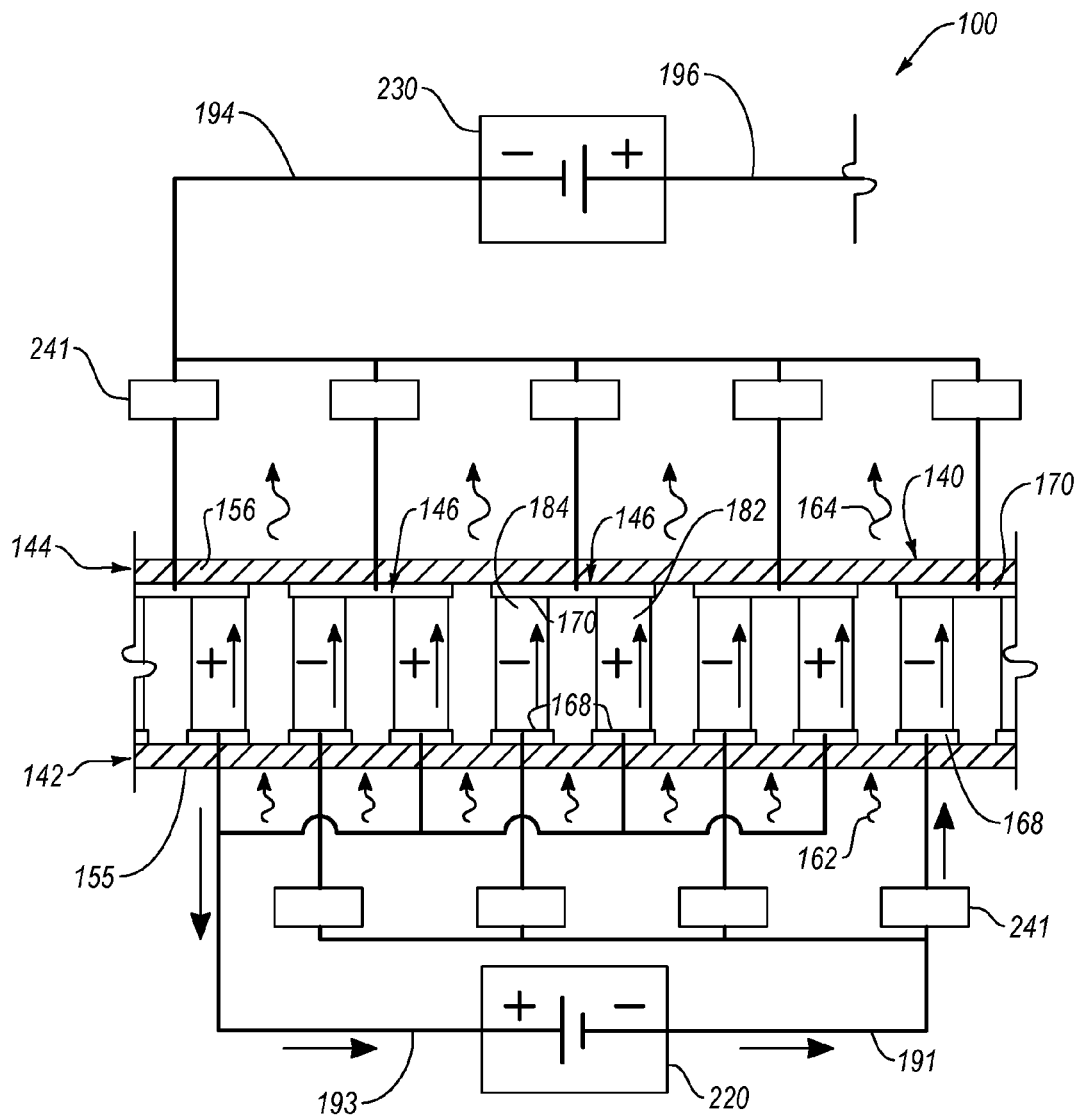
FIG. 6 is a schematic, partial cross-sectional side view of a thermal regulation device of the motor of FIG. 3, operating in a first operational mode, according to one or more embodiments of the present disclosure.
Figure 7:
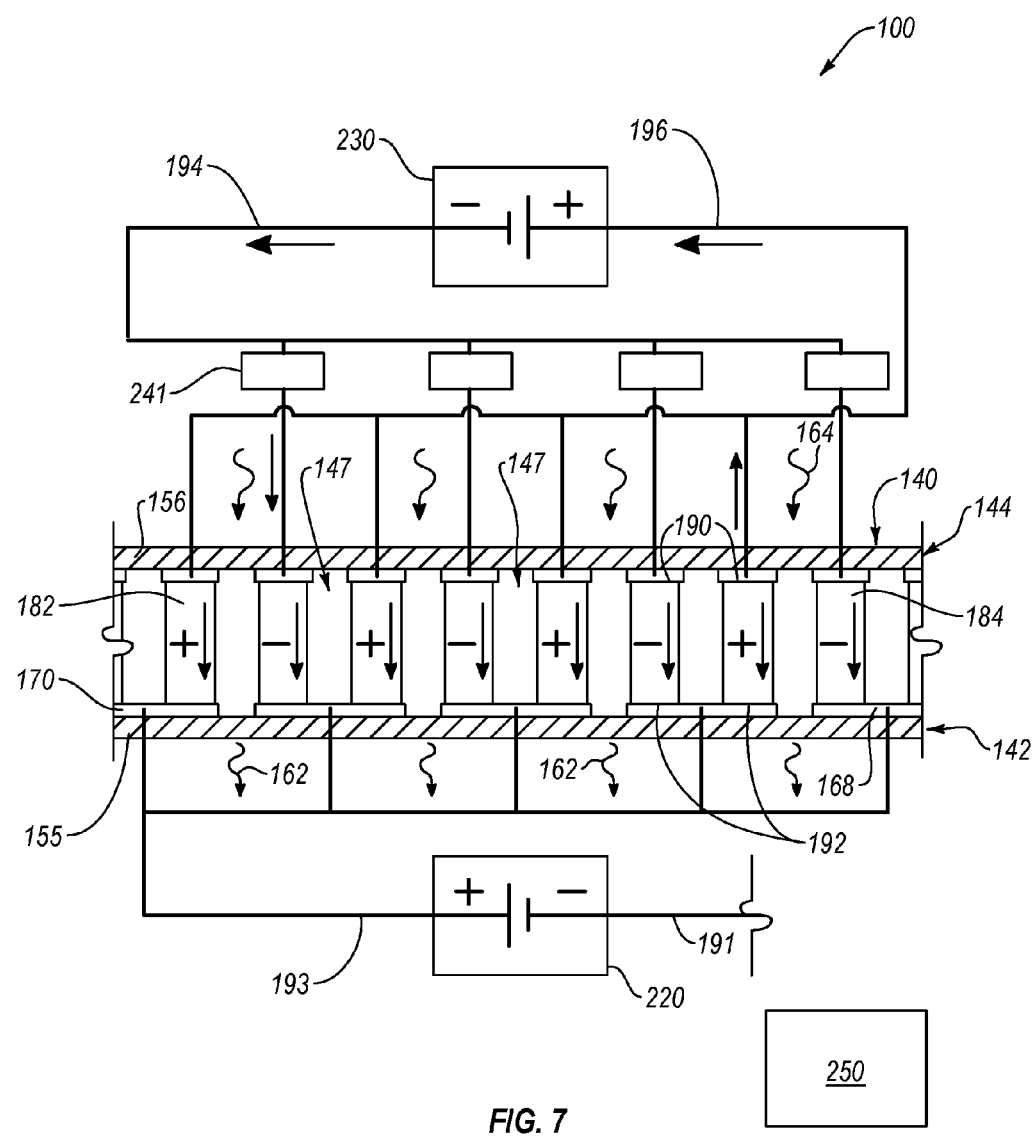
FIG. 7 is a schematic, partial cross-sectional side view of a thermal regulation device of the motor of FIG. 3, operating in a second operational mode, according to one or more embodiments of the present disclosure.

In some embodiments, the thermal regulation device 140 is selectively operable to reverse the rotational direction of the belt 130, thereby reversing the rotational direction of the first rotatable member 110 and drive shaft 50. As mentioned above, in a first operational mode, some heat transfer elements 146 transfer heat from the first side 142 to the second side 144 to rotate belt 130 in the first rotational direction 150, and, in a second operational mode, some heat transfer elements 146 transfer heat from the second side 144 to the first side 142. Referring to FIGS. 6 and 7, the motor 100 may include a control module 250 that is selectively operable to switch operation of the motor 100 between the first and second operational modes.

Generally, the thermal regulation device 140 is configured to operate in the first and second operational modes by including some heat transfer elements 146 oriented in a first orientation relative to the first and second thermally conductive elements 155, 156 (see, e.g., FIG. 6), and including some heat transfer elements 146 oriented in a second orientation relative to the first and second thermally conductive elements 155, 156 (see, e.g., FIG. 7). As shown in FIGS. 6 and 7, the heat transfer elements 146 in the second orientation are reversed or flipped relative to the heat transfer elements 146 in the first orientation. More specifically, in the first orientation as shown in FIG. 6, the electrical terminals 168 of the heat transfer elements 146 are on the first side 142 and the bridge electrical terminals 70 are on the second side 144 of the thermal regulation device 140 and, in the second orientation as shown in FIG. 7, the electrical terminals 168 of the heat transfer elements 146 are on the second side 144 and the bridge electrical terminals 70 are on the first side 142 of the thermal regulation device 140.

Referring to FIG. 6, in the first operational mode, the transfer of heat from the first thermally conductive element 155 to the second thermally conductive element 156 is performed as described above in relation to FIG. 5. In contrast, as shown in FIG. 7, in the second operational mode, the transfer of heat from the second thermally conductive element 156 to the first thermally conductive element 155 is performed in a reversed manner. More specifically, in the closed circuit of each heat transfer element 146 of FIG. 7, electrical current from an electrical power signal passes from a negative power line 194 of a power source 230 into the first electrical terminal 168, coupled to a first end 190 of the N-element 184. From the N-element 184, electrical current passes into and through the bridge electrical terminal 170 electrically coupling second ends 192 of the N-element 184 and P-element 182. From the bridge electrical terminal 170, electrical current passes into and through the P-element 182 and into the second electrical terminal 168 coupled to a first end 190 of the P-element 182. From the second electrical terminal 168 of the P-element 182, the electrical current passes into and through a positive line 196 of the power source 220 to complete the circuit. In some implementations, the electrical power source 230 can be controllable to open and close the circuit as desired. Further, in certain implementations, the electrical power source 230 is the same electrical power source as the electrical power source 220.

Referring to FIG. 7, when the electrical circuit of each is closed, the electrical current passing through the N-element 184 and P-element 182 of each heat transfer element 146 causes electrons in the N-element 184 to flow from the first end 190 to the second end 192 (e.g., from the terminal 168 to the bridge electrical terminal 170, as indicated by directional arrows in FIG. 5. The electrical current passing through the P-element 182 causes positive elements or holes also too flow from the first end 190 to the second end 192 of the P-element 182. The unidirectional flow of electrons (e.g., negative elements) and positive elements through the N-element 184 and P-element 182, respectively, induces a flow of thermal energy in the same direction. Accordingly, the first thermally conductive element 155 has a hotter temperature and thus acts as a hot layer or hot plate and the second thermally conductive element 156 has a colder temperature and thus acts as a cold layer or cold plate. In other words, the flow of thermal energy creates a temperature gradient between the electrical terminals 168, 170, with the electrical terminals 168 being thermally coupled to the second thermally conductive element 156 to create a cold side, and the bridge electrical terminal 170 being thermally coupled to the first thermally conductive element 155 to create a hot side. Accordingly, in the second operational mode, each heat transfer element 146 transfers heat from the second thermally conductive element 156 to cool the second side 144 of the thermal regulation device 140 and transfers heat to the first thermally conductive element 155 to heat the first side 142 of the thermal regulation device 140 via heat transfer induced by the flow of electricity through the N-element 184 and P-element 182.

The plurality or array of heat transfer elements 146 of the thermal regulation device 140 can be arranged relative to each other in any of various patterns or arrays, such as linearly aligned or staggered. In certain implementations, the heat transfer elements 146 may be configured and arranged to conserve space and have a higher areal density. For a thermal regulation device 140 operable in a single operational mode, as described above in relation to FIG. 5, all the heat transfer elements 146 are oriented in the same manner and positioned adjacent each other in any of various patterns. However, for a thermal regulation device 140 operable in two operational modes, as described above in relation to FIGS. 6 and 7, some heat transfer elements 146 are oriented as shown in FIG. 6 and some heat transfer elements 146 are oriented as shown in FIG. 7. In one implementation, the heat transfer elements 146 in one orientation are positioned directly adjacent each other to form first rows and the heat transfer elements 146 in the opposite orientation are also positioned directly adjacent each other to form second rows. The thermal regulation device 140 may alternate first and second rows in some implementations.

Figure 8:
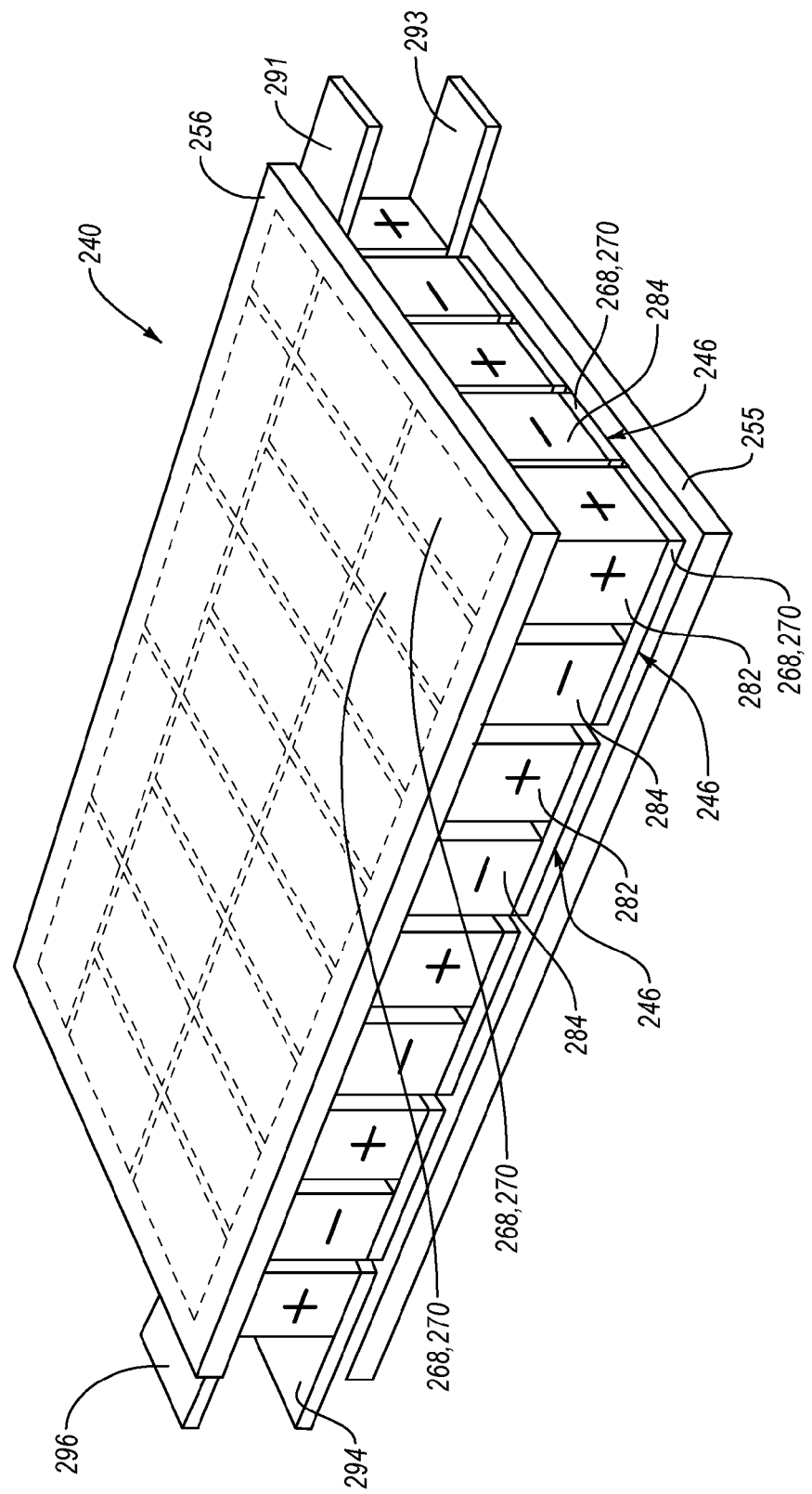
FIG. 8 is a schematic, perspective view of a thermal regulation device of the motor of FIG. 3, according to one or more embodiments of the present disclosure.

Alternatively, in certain implementations, such as shown in FIG. 8, a thermal regulation device 240, operable in two operational modes, may be configured such that heat transfer elements 246 in a first orientation are staggered with the heat transfer elements 246 in a second, opposite, orientation. For example, thermal regulation device 240 includes an array of heat transfer elements 246 positioned between first and second thermally conductive elements 255, 256. The thermal regulation device 240 is similar to the thermal regulation device 140, with like numbers referring to like features. However, unlike the thermal regulation device 140, each heat transfer element 246 in a first orientation of the thermal regulation device 240 shares its P-element 282 and N-element 284 with adjacent heat transfer elements 246 in a second orientation, and vice versa. More specifically, each heat transfer element 246 includes a P-element 282 and an N-element 284. First ends of the P-element 282 and N-element 284 of each heat transfer element 246 in the first orientation are electrically coupled to respective electrical terminals 268 that are electrically insulated from each other. Second ends of the P-element 282 and N-element 284 are electrically coupled together by a bridge electrical terminal 270 that extends between the second ends. This configuration of the heat transfer elements 246 in the first orientation is similar to the heat transfer elements 146 in FIGS. 5 and 6 in that when electrical power is supplied to the heat transfer elements 246 in the first orientation during a first operational mode, via respective positive and negative first power lines 291, 293, heat is transferred from the first thermally conductive element 255 (e.g., acting as a cold element) to the second thermally conductive element 256 (e.g., acting as a hot element).

As shown, each heat transfer element 246 in the second orientation also includes a P-element 282 and an N-element 284. However, the P-element 282 of each heat transfer element 246 in the second orientation is the P-element of the adjacent heat transfer element 246 in the first orientation. In other words, first heat transfer element 246 pairs (i.e., one heat transfer element 246 in the first orientation and one heat transfer element 246 in the second orientation) share a P-element 282. Similarly, the N-element 284 of each heat transfer element 246 in the first orientation is the N-element of another adjacent heat transfer element 246 in the second orientation. In other words, second heat transfer element 246 pairs share an N-element 184. First ends of the P-element 282 and N-element 284 of the heat transfer elements 246 in the second orientation are electrically coupled to respective electrical terminals 268 that are electrically insulated from each other. Moreover, the second ends of the P-element 282 and N-element 284 of each heat transfer element 246 in the second orientation are electrically coupled together by a bridge electrical terminal 270 that extends between the second ends. This configuration of the heat transfer elements 246 in the second orientation is similar to the heat transfer elements 246 in FIG. 7 in that when electrical power is supplied to the heat transfer elements 246 in the second orientation during a second operational mode, via respective positive and negative second power lines 294, 296, heat is transferred from the second thermally conductive element 256 (e.g., acting as a cold layer) to the first thermally conductive element 255 (e.g., acting as a hot layer).

As shown, the electrical terminals 268 of each heat transfer element 246 in the second orientation also function as the bridge electrical terminals 270 for two adjacent heat transfer elements 246 in the first orientation. Additionally, the bridge electrical terminal 270 for each heat transfer element 246 in the second orientation also functions as one of the two electrical terminals 268 of an adjacent heat transfer element 246 in the first orientation. Because electrical power is separately and non-concurrently supplied to the heat transfer elements 246 in the first and second orientations, respectively, via first power lines 291, 293 and second power lines 294, 296, respectively, and P-elements and N-elements support bi-directional flow of positive and negative elements, the P-elements 282 and N-elements 284 can be shared between adjacent heat transfer elements 246 in the first and second orientations via the configuration and placement of the electrical terminals 268, 270. Sharing P-elements and N-elements in this manner reduces the number of P-elements and N-elements required to provide the same level of heat transfer compared to heaters and coolers that do not share P-elements and N-elements.

Although the heat transfer elements of the thermal regulation device of the present disclosure have heretofore been described as containing one P-element and one N-element, in other embodiments, all or at least one of the heat transfer elements can have more than one P-element and/or N-element. For example, some or all of the heat transfer elements may each have multiple pairs of P-elements and N-elements in certain implementations, and some or all of the heat transfer elements may each have more P-elements than N-elements, or vice versa.

Additionally, in some embodiments, the features of the thermal regulation device of the present disclosure may incorporate nanoscale or microscale components to conserve space and facilitate microscale thermal management. Similar nanoscale and microscale components may be used to physically and/or electrically couple the temperature control system to other systems of a vehicle or other complex structure.

As shown in the illustrated embodiments, the array of heat transfer elements of the thermal regulation device are evenly or uniformly distributed between the first and second thermally conductive elements such that the heat transfer from the thermally conductive elements is substantially uniform across the thermally conductive elements. However, in some embodiments, it may be desirable to transfer more heat at certain locations relative to the belt than other locations. Accordingly, the distribution of heat transfer elements may be non-uniform to accommodate any need for more heat transfer at certain locations on the layers compared to other locations.

According to some embodiments, the control of the array of heat transfer elements of the thermal regulation device of the present disclosure may include uniform and/or non-uniform control of the heat transfer elements. In certain implementations, the heat transfer elements are uniformly controlled such that each heat transfer element with a given orientation has the same heat transfer characteristics at the same time. In such implementations, the characteristics (e.g., amplitude, frequency, etc.) of the electrical power inputs to each heat transfer element may not be individually controllable. However, in some implementations, the heat transfer elements can be non-uniformly controlled. For example, some heat transfer elements of the same orientation can be selectively activated, while others of the same orientation are not activated, or alternatively, all heat transfer elements of the same orientation are activated but controlled differently to produce different heat transfer characteristics at different locations along the thermal regulation device.

Referring to FIGS. 5-7, the uniform or non-uniform control of heat transfer elements of the thermal regulation device of the present disclosure can be provided by the control module 250. The control module 250 may execute one or more algorithms that control the heat transfer elements based on inputs from a user (e.g., pilot input, flight control system input, etc.). For example, the input may include a desired configuration of an actuated component (e.g., adjustment of the position of the elevator 20), and the control module 250, in response to the input, may activate the heat transfer elements to actuate the actuator such the actuated component is placed in a desired position.

In some implementations, the control module 250 is operable in a uniform mode to simply close a circuit to supply an electrical current with set characteristics from an electrical power source to all the heat transfer elements of a given orientation. Alternatively, the control module 250 can be configured to operate in a non-uniform mode in some implementations to selectively close individual circuits to the heat transfer elements to selectively supply an electrical current to each heat transfer element independently of the others. Further, the control module 250 may be configured to regulate the characteristics of the electrical current supplied to the heat transfer elements from the electrical power source whether in a uniform or non-uniform manner. The electrical power source can be a single power source with multiple positive and negative power line sets each corresponding to the heat transfer elements of a given orientation. Alternatively, as shown, the heat transfer elements of a given orientation can be powered by separate electrical power sources (e.g., power sources 220, 230). The electrical power source can be any of various sources known in the art, such as batteries, generators, alternators, and the like.

Shown schematically in FIGS. 6 and 7, the thermal regulation device 140 may include respective individually-controlled switches 241 or regulators coupled to the negative power lines 191, 194 of the heat transfer elements 146. In one implementation, the switches 241 are individually controllable by the control module 250 to supply or prevent electrical power to respective heat transfer elements 146. Additionally, in some implementations, the switches 241 are individually controllable by the control module 250 to modulate the characteristics of the electrical power supplied to respective heat transfer elements 146.

Figure 9:
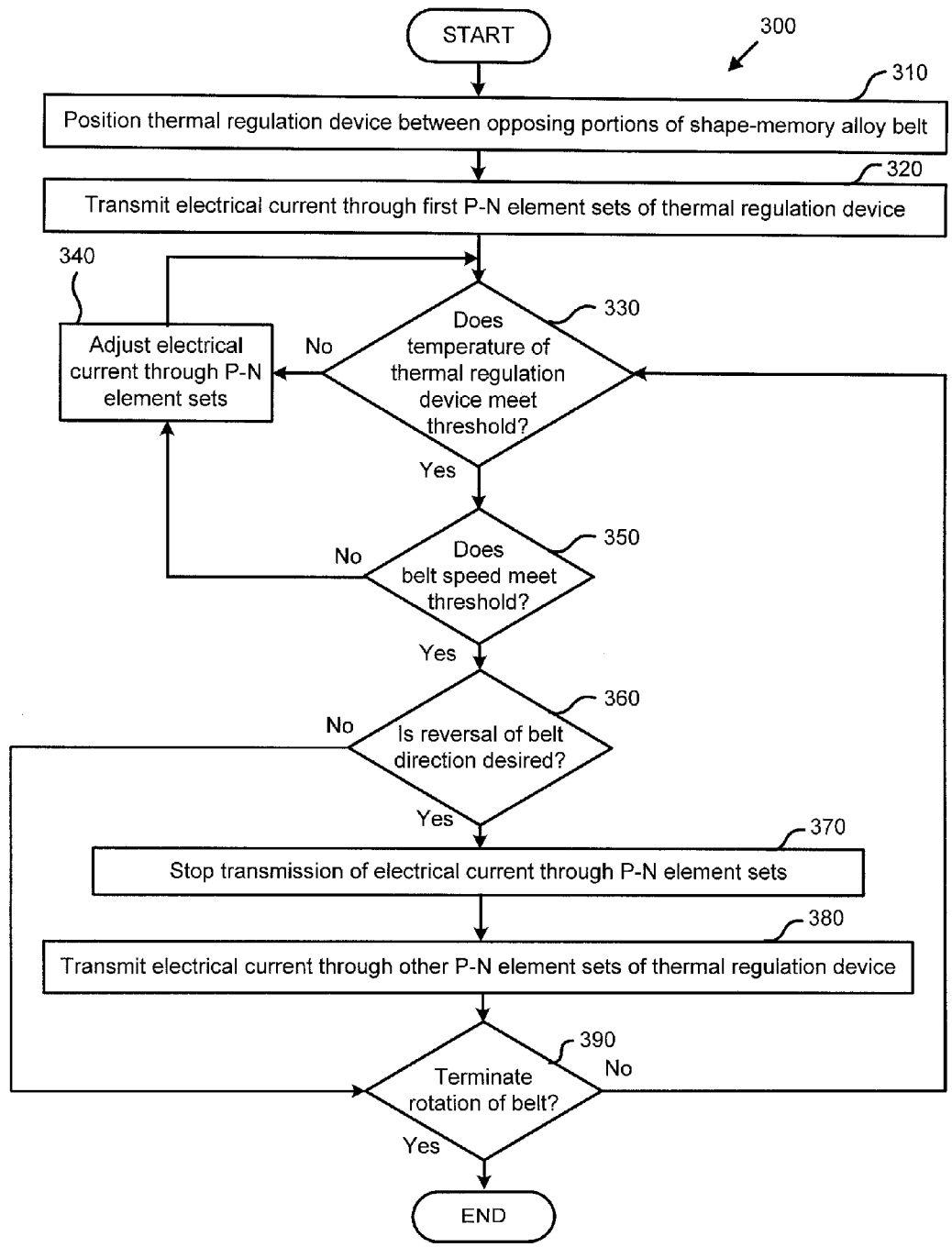
FIG. 9 is a schematic flow diagram of a method of rotating a first rotatable member, according to one or more embodiments of the present disclosure.

Referring to FIG. 9, one embodiment of a method 300 of rotating a first rotatable member includes positioning a thermal regulation device between opposing portions of a shape-memory alloy belt at 310. The shape-memory alloy belt is a belt made from a shape-memory alloy. The method 300 may also include co-rotatably coupling the belt with the first rotatable member. Additionally, the method 300 includes transmitting electrical current through first P-N element sets or heat transfer elements of the thermal regulation device at 320. Transmitting electrical current through first P-N element sets or heat transfer elements of the thermal regulation device includes cooling a first portion of the belt to contract the first portion of the belt, and, while cooling the first portion of the belt, heating a second portion of the belt to expand the second portion of the belt. Generally, cooling the first portion of the belt while heating the second portion of the belt, to cooperatively contract and expand the belt, causes the belt to rotate in a first rotational direction, which rotates the first rotatable member in the first rotational direction. The acceleration and rotational speed of the belt depends on the temperature-change rate and the temperature, respectively, of the thermal regulation device. More specifically, the acceleration and rotational speed of the belt depends on the temperature-gradient-change rate and the temperature gradient, respectively, of the thermal regulation device. In other words, the faster the thermal regulation device can produce a desired temperature gradient, the faster the acceleration of the belt to a given rotational speed proportional to the temperature gradient.

The method 300 includes determining whether the temperature of the thermal regulation device meets a temperature threshold, which can be predetermined, at 330 and/or determining whether the rotational speed of the belt meets a speed threshold, which can be predetermined, at 350. If either of the determinations at 330 or 350 is answered negatively, the method 300 includes adjusting the electrical current through the P-N sets, or heat transfer elements, at 340 to adjust the temperature of the thermal regulation device and/or the rotational speed of the belt. In some implementations, a motor may include a temperature sensor that senses the temperature of the thermal regulation device (e.g., temperature sensors T of motor 100, as shown in FIG. 5, that sense the respective temperatures of the first and second thermally conductive elements 155, 156) and/or a speed sensor that senses the rotational speed of the belt (e.g., speed sensor 132, as shown in FIG. 3, that senses the rotational speed of the belt 130). Because the temperature, or more specifically the temperature gradient, of the thermal regulation device is proportional to the rotational speed of the belt, the rotational speed of the belt may be inferred from the temperature of the thermal regulation device, and, correspondingly, the temperature of the thermal regulation device can be inferred from the rotational speed of the belt.

In some implementations, the method 300 includes reversing the direction of the belt, such as to actuate an actuatable element back to a start position from an actuated position. Accordingly, the method 300 includes determining if reversal of the direction of the belt is desired at 360. The desirability of reversing the direction of the belt may be determined via a control system, such as from a control module that commands the thermal regulation device to reverse the direction of the belt. If reversal of the belt is desired at 360, then the method 300 includes stopping transmission of the electrical current through the P-N element sets or heat transfer elements at 370 and transmitting electrical current through other P-N element sets or heat transfer elements of the thermal regulation device at 380. The other P-N element sets may be heat transfer elements that have an opposite orientation compared to the P-N element sets through which electrical current was transmitted in step 320. Transmitting electrical current through the oppositely oriented P-N element sets of the thermal regulation device includes heating the first portion of the belt to expand the first portion of the belt, and, while heating the first portion of the belt, cooling the second portion of the belt to contract the second portion of the belt. Generally, heating the first portion of the belt while cooling the second portion of the belt, to cooperatively expand and contract the belt, causes the belt to rotate in a second rotational direction, opposite the first rotational direction, which rotates the first rotatable member in the second rotational direction.

The method 300 determines if termination of the rotation of the belt is desired at 390, and if so, terminates actuation of the belt. In some implementations, for a thermal regulation device with heat transfer elements having first and second orientations, to more quickly or responsively stop rotation of the belt, not only are the heat transfer elements inducing the rotation of the belt in the given rotational direction controlled to stop heat transfer in a given direction across the thermal regulation device, but the other heat transfer elements with the opposite orientation are controlled to start heat transfer in an opposite direction across the thermal regulation device until the rotation of the belt slows to stop.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A motor, comprising:
    a first rotatable member;
    an anchor, spaced apart from the first rotatable member;
    a belt, in tension about the first rotatable member and the anchor, the belt being co-rotatably engaged with the first rotatable member, wherein the belt is made from a shape-memory alloy; and
    a thermal regulation device comprising a heat generating element, the heat generating element positioned at least partially in a gap between spaced-apart first and second portions of the belt and configured to concurrently cool the first portion of the belt to contract the first portion of the belt and heat the second portion of the belt to expand the second portion of the belt, wherein concurrent contraction and expansion of the first and second portions of the belt cause rotation of the belt.

2. The motor according to claim 1, wherein:
    the anchor comprises a second rotatable member; and
    the belt is co-rotatably engaged with the second rotatable member.

3. The motor according to claim 1, wherein the first rotatable member comprises a drive shaft.

4. The motor according to claim 3, wherein the first rotatable member further comprises a wheel co-rotatably coupled to the drive shaft.

5. The motor according to claim 1, further comprising spaced-apart first and second guide elements engaged with the belt, wherein the first and second guide elements cooperate with the anchor to:
    position the first portion of the belt a first distance away from the thermal regulation device; and
    position the second portion of the belt a second distance away from the thermal regulation device.

6. The motor according to claim 5, wherein the first distance and the second distance are constant along an entire length of the thermal regulation device.

7. The motor according to claim 1, wherein:
    the thermal regulation device comprises a first surface directly adjacent the first portion of the belt;
    the thermal regulation device comprises a second surface directly adjacent the second portion of the belt;
    the thermal regulation device is selectively operable to generate a first temperature of the first surface and a second temperature of the second surface; and
    the first temperature is different than the second temperature.

8. The motor according to claim 7, wherein:
    the thermal regulation device is powered by an electrical power signal; and
    the first temperature and the second temperature are inversely proportionally adjustable by adjusting a current of the electrical power signal.

9. The motor according to claim 7, wherein:
    the thermal regulation device comprises at least one heat transfer element, positioned between and thermally coupled with the first and second surfaces of the thermal regulation device; and
    the at least one heat transfer element comprises a P-element made from a P-type semiconductor material and an N-element made from an N-type semiconductor material.

10. The motor according to claim 9, wherein the thermal regulation device comprises an array of heat transfer elements.

11. The motor according to claim 7, wherein:
    in a first operational mode, the first temperature is higher than the second temperature to cause rotation of the belt in a first rotational direction; and
    in a second operational mode, the first temperature is lower than the second temperature to cause rotation of the belt in a second rotational direction, opposite the first rotational direction.

12. The motor according to claim 1, further comprising a control module operably coupled with the thermal regulation device, wherein the control module is configured to:
    activate the thermal regulation device, to cause the first rotatable member to rotate;
    change a power input to the thermal regulation device, to adjust a rotational speed of the first rotational member; and
    deactivate the thermal regulation device, to cause the first rotatable member to stop rotating.

13. The motor according to claim 12, further comprising at least one temperature sensor, configured to sense a temperature of the thermal regulation device, wherein the control module modulates the thermal regulation device, to adjust a rotational speed of the first rotational member, based, at least in part, on the temperature of the thermal regulation device sensed by the at least one temperature sensor.

14. An aircraft, comprising:
    an actuatable element; and
    a motor, coupled with the actuatable element and operable to actuate the actuatable element, wherein the motor comprises:
        a first rotatable member;
        an anchor, spaced apart from the first rotatable member;
        a belt, in tension about the first rotatable member and the anchor, the belt being co-rotatably engaged with the first rotatable member, wherein the belt is made from a shape-memory alloy; and
        a thermal regulation device comprising a heat generating element, the heat generating element positioned at least partially in a gap between spaced-apart first and second portions of the belt and configured to concurrently cool the first portion of the belt to contract the first portion of the belt and heat the second portion of the belt to expand the second portion of the belt, wherein concurrent contraction and expansion of the first and second portions of the belt causes rotation of the belt.

15. A method of rotating a first rotatable member, comprising:
    co-rotatably coupling a belt, made from a shape-memory alloy, with the first rotatable member;
    cooling, with a thermal regulation device comprising a heat generating element, a first portion of the belt to contract the first portion of the belt; and
    while cooling the first portion of the belt, heating, with a thermal regulation device, a second portion of the belt to expand the second portion of the belt, the heat generating element positioned at least partially in a gap between the first and second portions of the belt.

16. The method according to claim 15, wherein cooling the first portion of the belt and heating the second portion of the belt comprises transmitting an electrical current through a P-N element, comprising a P-element made from a P-type semiconductor material and an N-element made from an N-type semiconductor material.

17. The method according to claim 15, wherein:
    the first portion of the belt is cooled and the second portion of the belt is heated by a thermal regulation device positioned between the first portion of the belt and the second portion of the belt; and the method further comprises:
- determining a temperature of the thermal regulation device; and
- adjusting the temperature of the thermal regulation device if the temperature of the thermal regulation device is not within a predetermined temperature threshold.

18. The method according to claim 17, further comprising:
- determining a rotational speed of the belt; and
- adjusting the temperature of the thermal regulation device if the rotational speed of the belt is not within a predetermined speed threshold.

19. The method according to claim 18, further comprising transmitting an electrical power signal to the thermal regulation device, wherein adjusting the temperature of the thermal regulation device comprises changing a current of the electrical power signal.

20. The method according to claim 15, wherein:
- cooling the first portion of the belt and heating the second portion of the belt rotates the belt in a first rotational direction; and
- the method further comprises heating the first portion of the belt and cooling the second portion of the belt to rotate the belt in a second rotational direction, opposite the first rotational direction.

\* \* \* \* \*